Sept. 10, 1968     H. G. LORENTZEN     3,401,069
METHOD FOR INSTALLING RESINOUS FLOOR COVERINGS
Filed June 26, 1964
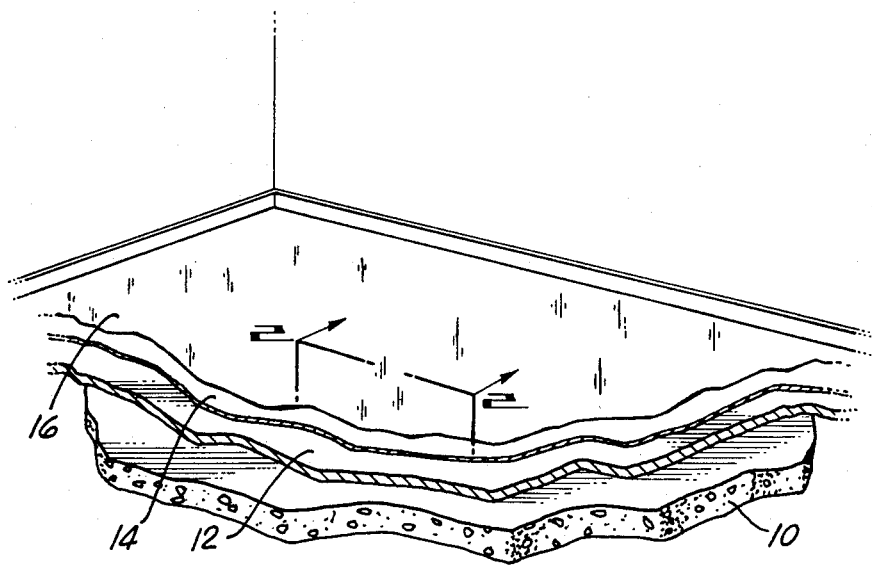
FIG_1
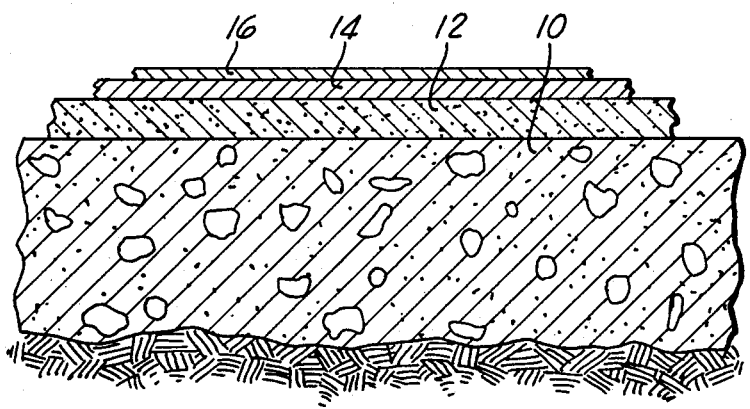
FIG_2
INVENTOR.
HAROLD G. LORENTZEN
BY
ATTORNEYS United States Patent Office 3,401,069
Patented Sept. 10, 1968

3,401,069
METHOD FOR INSTALLING RESINOUS
FLOOR COVERINGS
Harold G. Lorentzen, 1155 5th St.,
Oakland, Calif. 94607
Filed June 26, 1964, Ser. No. 378,432
3 Claims. (Cl. 156—71)

ABSTRACT OF THE DISCLOSURE

A method for installing resinous floor coverings in which a resilient layer is bonded to the floor surface with an adhesive, a resin coating applied directly over the resilient layer and the resin coating cured in place.

---

This invention relates to a method for the application of resinous surface coverings to such areas as floors that have become worn and are in need of repair or reconditioning. It provides a way of installing a new covering without requiring substantial preliminary preparation of the surface and at the same time results in improved adhesion of the covering to the surface.

In essence, the invention involves the use of an intermediate sheet that is first bonded to the surface to be covered. The finish covering is then applied by spraying, for example, over the intermediate sheet and becomes bonded to it. In this way the primary or supporting surface need not be specially prepared to receive the resinous covering and significant savings and advantages are gained. A brief discussion of prior techniques will aid in the appreciation of these advantages.

Taking a cement floor that is to be resurfaced with a resinous covering as an example, the most economical way of applying the resin is to coat the floor with resin forming components such as monomers, catalysts, fillers and pigments and then cure and form the resin in place on the floor. This technique yields a continuous resinous surface without joints or seams. Where resin forming components are sprayed into place the savings in time and labor over conventional methods of installation involving the tedious placement of a plurality of preformed sheets or tiles which must then be fitted together is dramatic. This in-place formation method is also described in copending patent application, Ser. No. 378,465, filed June 26, 1964. The method there described and claimed includes details for obtaining a decorative appearance on the resin surface when using the in-place formation technique. All of such approaches described in that application are applicable to the instant case.

In order to spray resin forming components over a cement or other surface it is necessary to prepare the surface so as to obtain the requisite adhesion between the cement and the resin. Dirt, grease, and other foreign matter create a situation that is not conducive to adhesion. In addition cracks and other impressions in the surface may show up in the finished resin surface. This may occur where the sprayed resin is fluid immediately after application to the surface (as is generally the case) so that it can flow into the cracks and assume the uneven configuration of the floor.

Because of these and other factors it has been the practice to prepare the surface prior to application of the resin by one or more conventional techniques such as sand blasting and acid etching. To insure good adhesion it is preferred technique to apply a bond or prime coat of resin to the floor, particularly cement and similar surfaces, after it has been initially cleaned and dried. The prime coat may be any conventional clear resin coat such as a polyurethane, epoxy, or polyester resin for example. The desired surface covering is then applied over the prime coat after the prime coat has been sufficiently cured. All of the above steps obviously require substantial expenditure in time and labor, and supplies.

In accordance with the present invention most if not all of these preliminary steps are made obsolete. No preliminary substantial surface preparation is required. Sand blasting and acid etching are not necessary to attain the requisite adhesion. (Unusually large cracks, etc., might still have to be filled so as to provide an adequate supporting surface for the resin.) Instead of the usual preparation, an intermediate sheet is installed in one piece if convenient or in several abutting pieces as required to cover the area involved. The installation is made directly over the surface so long as it is reasonably clean.

The intermediate sheet is bonded to the surface by any suitable manner and will usually involve the use of an adhesive of any of the various types and manufacture well known to those skilled in the art of surface covering installation. The adhesives now available commercially vary greatly in properties and one can be selected so that a bond is achieved between the intermediate sheet and the surface that is to be coated regardless of the type and condition of the supporting surface. Because of this, substantial surface preparation or prime coat is unnecessary.

The selected intermediate sheet is suitably relatively thin and resilient for ease of installation and conformity with the general over-all contour of the surface to be covered. The only requirement for this intermediate sheet is that it can be bonded, as by adhesives, to the floor and that it presents a smooth surface upon which the resin can be coated. Suitable materials from which the intermediate sheet may be formed include paper, particularly vapor barrier paper such as kraft paper, asphalt paper, and felt paper having a weight of about 1 to 80 pounds per 100 square feet. Other types of suitable intermediate sheets may be formed from woven fibrous materials such as burlap. Another alternative is to form the intermediate sheet from conventional cushion or sponge padding of the type normally associated with carpeting. These materials include sheets of flexible polyurethane, neoprene, rubber, and polyurethane foam which vary from about $\frac{1}{8}''$ to $1''$ in thickness and have densities of about 5 ounces to 2 pounds per cubic foot. Where such a material is used as the intermediate sheet, the surface covering prepared in accordance with the present invention has a spongy resilient feel much like that of heavily padded conventional carpeting.

The resin covering can be applied in any convenient manner to the intermediate sheet. Thus the resin forming components can be brushed, sprayed, or troweled over the intermediate sheet. The preferred technique is to spray the resin forming components together with the desired inert fillers and other desired ingredients such as pigments for color. This achieves the optimum in speed and labor savings.

Any durable type of resin suitable for surface coverings can be applied, provided that the resin is curable at ambient conditions. Many of the commercially available peroxide cured materials are quite satisfactory for this purpose. A preferred type of material is the polyurethane elastomer of the type illustrated in the example to follow, although other types of resins such as polyesters could be used as will be obvious to those skilled in this art.

After the surface covering has been coated in place and cured to a suitable extent, the surface may be used as such or preferably further coated with a clear finish coat of resin. For example, a moisture cured urethane or two-component polyester depending upon the traffic which the surface must withstand can be used for this final clear coat. The following example will illustrate the present invention in more detail.

Example

A cement floor can be resurfaced in the following manner: Saturated asphalt paper (15 pounds per 100 square feet) is bonded to the cement surface with an asphalt cut back adhesive such as Tile-Tex GF–8 manufactured by the Flintkote Company. No substantial preparation of the surface is attempted other than a light clean-up if required and the asphalt paper is joined directly to the cement with the adhesive. The resinous covering may be sprayed directly over the asphalt paper utilizing a Sealsit urethane model spray gun. The preferred resin covering employed has the following composition and comprises a two-component polyurethane elastomer.

Part 1 (colored portion): 100 parts by weight of high molecular weight polyhydric alcohol containing inert filler material colored with conventional inorganic or organic colors dispersed throughout to achieve the desired color.

The inert filler which may be utilized in the resinous coat is not critical. Typical materials which may be used are aggregate, common extender pigments, or pigments such as talc, finely divided silica, calcium carbonate and the like. These may be used in any appropriate amount generally being about 7–38% by weight of the resin.

Part 2 (isocyanate prepolymer): 20½ parts by weight of the reaction product of a high molecular weight polyester alkyd having terminal hydroxyl groups that have been reacted with an organic isocyanate.

The above two components are sprayed in the proportions noted through the spray gun. This equipment contains a mixing chamber at the gun head which thoroughly combines the resin and any suitable peroxide catalyst just prior to the discharge from the gun. The material thus applied is cured in place by the catalyst under ambient conditions and bonds to the asphalt paper forming the surface covering in a continuous or seamless layer. This surface may be allowed to dry (usually about eight hours) at which time it is sufficiently dry for traffic. Where desired a clear resinous top coat of, for example, a two-component polyester resin can be sprayed thereover.

As mentioned earlier, the resinous surface covering may be used as such, colored by pigment distributed throughout, or decorated in accordance with the details described in the above cited copending application.

Aside from the labor advantages gained by the present invention it has been found that the adhesion of the resinous covering to the floor is substantially improved as compared with resinous coverings that are applied in the conventional fashion previously described.

These new techniques are applicable to the covering of all types of floors including cement, wood, brick, asphalt, metal, plastic and other. Also, the concept is not limited to floors and it is contemplated as encompassing all types of surfaces including walls for example. In these other cases some modification may be advisable such as the use of less fluid resin forming components.

In the drawing:

FIG. 1 is a fragmentary perspective view in partial section showing the invention as applied to an existing floor, and FIG. 2 is a fragmentary vertical cross-section through a section of floor showing the invention as applied.

Referring now more particularly to the drawing in which the same reference numerals refer to the same parts in each of the several views, the concrete or other kind of floor to which a resinous surface is to be applied is shown generally at 10. The floor 10 is given a light clean-up in order to remove loose material from the surface thereof and then a layer of adhesive is applied over the entire surface. An intermediate cushion layer 12 which may be made up of sheets of flexible polyurethane, neoprene or rubber sponge, or polyurethane foam is then applied directly to the adhesive so that it is firmly bonded in place. Next a layer of resin-forming components 14 is applied directly to the cushion layer 12. This is applied by spraying, troweling, or other suitable means, the primary objective being to obtain a uniform resinous layer over the entire floor surface without seams or joints of any kind. After the resin-forming components have been applied, the layer may be allowed to cure in place for the required length of time depending upon the particular components utilized. After the resin layer 14 is formed in place and has been cured so that it is bonded directly to the sponge layer 12, a clear resin layer 16 may be applied uniformly over the surface of the resin layer 14. This clear resin layer 16 will seal and protect the resinous layer below from excessive wear.

Although the foregoing invention has been described in some detail by way of illustration and example for purposes of clarity of understanding, it is understood that certain changes and modifications may be practiced within the spirit of the invention as limited only by the scope of the appended claims.

I claim:

1. An improved method for installing a seamless resinous surface covering upon an entire existing floor surface consisting essentially of the steps of: bonding an intermediate cushion layer having a thickness from about ⅛" to 1" and a density of about 5 ounces to 2 pounds per cubic foot to said entire existing floor surface without substantial preparation of said floor surface, then coating said intermediate cushion layer with a continuous layer of resin by spraying resin-forming components substantially uniformly thereover, and then curing said sprayed layer in place to form a seamless resin surface covering bonded to the intermediate cushion layer.

2. A method in accordance with claim 1 and including the step of spraying a layer of clear resin over said resinous surface covering after said resinous surface covering has been sufficiently cured.

3. An improved method for installing a seamless resinous surface covering upon an entire existing floor surface consisting essentially of the steps of: bonding an intermediate cushion layer having a thickness from about ⅛" to 1" and a density of about 5 ounces to 2 pounds per cubic foot to said entire existing floor surface without substantial preparation of said floor surface, then coating said intermediate cushion layer with a continuous layer of resin by troweling resin-forming components substantially uniformly thereover, and then curing said troweled layer in place to form a seamless resin surface covering bonded to the intermediate cushion layer.

References Cited

UNITED STATES PATENTS

| | | | |
|---|---|---|---|
| 1,797,998 | 3/1931 | Sadtler | 156—280 X |
| 2,160,729 | 5/1939 | Graham et al. | 156—71 X |
| 2,217,165 | 10/1940 | Graham et al. | 156—71 X |
| 3,037,900 | 6/1962 | Hings et al. | 156—314 X |
| 3,332,827 | 7/1967 | Griffith et al. | 156—71 X |

HAROLD ANSHER, *Primary Examiner.*